(12) United States Patent
Kubo (10) Patent No.: US 7,631,711 B2
(45) Date of Patent: Dec. 15, 2009

(54) COOLING DEVICE FOR ELECTRIC APPARATUS MOUNTED ON VEHICLE

(75) Inventor: Masahiko Kubo, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 80 days.

(21) Appl. No.: 12/081,495

(22) Filed: Apr. 16, 2008

(65) Prior Publication Data
US 2008/0257624 A1 Oct. 23, 2008

(30) Foreign Application Priority Data
Apr. 18, 2007 (JP) ............................. 2007-109683

(51) Int. Cl.
*B60K 11/06* (2006.01)
*B60K 1/04* (2006.01)
*B60R 16/04* (2006.01)

(52) U.S. Cl. .................... 180/68.1; 180/68.5; 180/65.1; 180/65.21

(58) Field of Classification Search ............... 180/65.1, 180/65.21, 68.1, 68.5; B60K 11/06, 1/04; B60R 16/04
See application file for complete search history.

(56) References Cited

U.S. PATENT DOCUMENTS

| | | | | | |
|---|---|---|---|---|---|
| 4,468,440 | A | * | 8/1984 | Evjen ............................ | 429/8 |
| 5,390,754 | A | * | 2/1995 | Masuyama et al. .......... | 180/68.5 |
| 5,392,873 | A | * | 2/1995 | Masuyama et al. .......... | 180/68.5 |
| 5,490,572 | A | * | 2/1996 | Tajiri et al. ................. | 180/65.1 |
| 5,558,949 | A | * | 9/1996 | Iwatsuki et al. .............. | 429/99 |
| 5,730,237 | A | * | 3/1998 | Matsuki et al. ............. | 180/65.1 |
| 6,085,854 | A | * | 7/2000 | Nishikawa .................. | 180/68.5 |
| 6,094,927 | A | * | 8/2000 | Anazawa et al. ............. | 62/239 |
| 6,188,574 | B1 | * | 2/2001 | Anazawa .................... | 361/695 |
| 6,220,383 | B1 | * | 4/2001 | Muraki et al. .............. | 180/68.5 |
| 6,315,069 | B1 | * | 11/2001 | Suba et al. ................. | 180/68.5 |
| 6,662,891 | B2 | * | 12/2003 | Misu et al. ................. | 180/68.1 |
| 7,025,159 | B2 | * | 4/2006 | Smith et al. ................ | 180/68.1 |
| 7,028,791 | B2 | * | 4/2006 | Chernoff et al. ........... | 180/65.1 |

(Continued)

FOREIGN PATENT DOCUMENTS

JP A-5-193374 8/1993

(Continued)

*Primary Examiner*—Paul N Dickson
*Assistant Examiner*—Jacob Meyer
(74) *Attorney, Agent, or Firm*—Oliff & Berridge, PLC (57) ABSTRACT

Exhaust air from an electric-powered battery cooling fan which draws in an exhaust airflow from a battery for traveling purpose is diffused in a direction to a ventilating opening provided in a first cross member, as shown by an arrow C (10), an arrow C (11), and an arrow C (12), in a direction to a first ventilating opening provided in a cushioning material and a first ventilating duct provided in a cushioning material, as shown by an arrow C (20), an arrow C (21), an arrow C (22), and an arrow C (23), and in a direction to a second ventilating opening provided in the cushioning material and a second ventilating duct provided in the cushioning material, as shown by an arrow C (30), an arrow C (31), an arrow C (32), and an arrow C (33). With such a configuration, a local temperature rise in a vehicle interior is avoided even though the exhaust airflow flows from the battery for traveling purpose, without the need of a large space.

4 Claims, 9 Drawing Sheets

U.S. PATENT DOCUMENTS

| | | |
|---|---|---|
| 7,051,825 B2 * | 5/2006 | Masui et al. ............... 180/68.5 |
| 7,079,379 B2 * | 7/2006 | Yamaguchi et al. ......... 361/676 |
| 7,083,016 B2 * | 8/2006 | Chernoff et al. ........... 180/65.1 |
| 7,096,986 B2 * | 8/2006 | Borroni-Bird et al. ...... 180/68.1 |
| 7,353,900 B2 * | 4/2008 | Abe et al. .................. 180/68.5 |
| 2002/0102457 A1 * | 8/2002 | Oogami et al. .............. 429/159 |
| 2003/0168267 A1 * | 9/2003 | Borroni-Bird et al. ...... 180/68.1 |
| 2008/0196957 A1 * | 8/2008 | Koike et al. ................ 180/68.5 |
| 2009/0166116 A1 * | 7/2009 | Kiya et al. ................. 180/68.5 |

FOREIGN PATENT DOCUMENTS

| | | |
|---|---|---|
| JP | A-10-181468 | 7/1998 |
| JP | A 10-252467 | 9/1998 |
| JP | A-2000-92624 | 3/2000 |
| JP | A 2001-167806 | 6/2001 |
| JP | A-2002-88636 | 3/2002 |
| JP | A 2002-329515 | 11/2002 |
| JP | A-2005-7915 | 1/2005 |
| JP | A 2005-302698 | 10/2005 |
| JP | A-2006-151008 | 6/2006 |
| JP | A 2006-324041 | 11/2006 |

* cited by examiner

COOLING DEVICE FOR ELECTRIC APPARATUS MOUNTED ON VEHICLE

This nonprovisional application is based on Japanese Patent Application No. 2007-109683 filed with the Japan Patent Office on Apr. 18, 2007, the entire contents of which are hereby incorporated by reference.

BACKGROUND OF THE INVENTION

1. Field of the Invention

The present invention relates to a cooling device for an electric apparatus mounted on a vehicle, and particularly relates to a cooling device for a power storage mechanism (a battery, a capacitor, and others), a PCU (Power Control Unit), and others used for an electric vehicle (EV), a hybrid vehicle (HV), and others.

2. Description of the Background Art

Each of an electric vehicle, a hybrid vehicle, and a fuel cell vehicle, which obtains driving force for the vehicle from an electric motor, is mounted with a power storage mechanism (a secondary battery (also referred to as a battery), a capacitor, and others). As to the electric vehicle, electric power stored in the power storage mechanism is used to drive an electric motor to thereby drive the vehicle. As to the hybrid vehicle, electric power stored in the power storage mechanism is used to drive an electric motor to thereby drive the vehicle, and an engine is assisted by the electric motor to thereby drive the vehicle. As to the fuel cell vehicle, electric power from a fuel cell is used to drive an electric motor to thereby drive the vehicle, and in addition to the electric power from the fuel cell, electric power stored in the power storage mechanism is used to drive the electric motor to thereby drive the vehicle.

A secondary battery (battery), which is an example of these power storage mechanisms, is required to output high voltage and high power, and hence a battery pack is formed by connecting approximately six battery cells such as lithium-ion batteries or nickel-hydrogen batteries of approximately 1.2 V in series to form a battery module, and connecting approximately 30-40 battery modules in series. The electric vehicle, the hybrid vehicle, and others must be mounted with such a voluminous secondary battery, which has not been mounted on the conventional vehicle that relies solely on the internal combustion engine as its driving source. From a viewpoint of effectively using a vehicle interior space and a luggage compartment space, assuring safety in the case of collision, and others, it is necessary to consider the position in the vehicle for mounting the secondary battery, which has a relatively large volumetric capacity among the electric apparatuses to be mounted on the vehicle. Furthermore, it is necessary to consider the position for mounting an inverter and a DC/DC converter, which are referred to as a PCU.

In this consideration, it is necessary to deliberate on the size of the secondary battery (a height, a length in a width direction of the vehicle, a length in a longitudinal direction of the vehicle), deliberate on uniform cooling of the secondary batteries because of Joule heat or heat liberation caused by a chemical reaction inside the secondary batteries, or deliberate on cooling of a heating element referred to as a power semiconductor and included in the PCU.

Japanese Patent Laying-Open No. 2001-167806 (Patent Document 1) discloses a vehicle-mounted battery pack which has a compact configuration, can easily be disposed in a small space in the motor vehicle, and can reduce variations in temperature among battery modules.

The vehicle-mounted battery pack is the one in which an assembled battery, which has a plurality of battery modules integrated therein into a rectangular parallelepiped shape, is accommodated in a battery accommodation case and mounted on the motor vehicle, characterized in that the assembled battery is disposed in the battery accommodation case in a manner tilted with respect to a bottom surface and a top surface of the battery accommodation case, such that one side portion of the assembled battery is located adjacently to the bottom surface of the battery accommodation case and the other side portion of the assembled battery is located adjacently to the top surface of the battery accommodation case, and also characterized in that a cross flow-type impeller is rotatably disposed inside the battery accommodation case such that the impeller extends along the entire one side portion of the assembled battery located adjacently to the bottom surface of the battery accommodation case.

The vehicle-mounted battery pack is configured such that cooling airflow is supplied to the entire assembled battery disposed in the battery accommodation case in a tilted manner, by the impeller disposed in the battery accommodation case. Therefore, the vehicle-mounted battery pack has a compact configuration and can be mounted in a small space in the motor vehicle. Furthermore, the battery modules in the assembled battery can be cooled efficiently and uniformly, and variations in temperature among the battery modules can be reduced.

Generally, after the cooling airflow supplied to the assembled battery cools (exchanges heat with) the assembled battery, it is exhausted to the vehicle interior or the outside of the vehicle (it may temporarily be exhausted to the vehicle interior, even if it is eventually exhausted to the outside of the vehicle). If air is exhausted to the vehicle interior in the same direction, a temperature of air in the vehicle interior may locally rise owing to, for example, air exhausted from the assembled battery installed on a floor panel under a rear seat. Furthermore, if the local temperature rise occurs at the lower portion of the rear seat, the exhaust airflow impinges upon the feet of a passenger/passengers sitting on the rear seat (on the right side or the left side, or the both sides), or warms the feet (uncomfortable feeling occurs).

However, Patent Document 1 merely describes that the cooling airflow, which passes through spacing among battery modules in the assembled battery, flows into a space under the assembled battery in the battery accommodation case, and that a part of the cooling airflow is exhausted into the vehicle interior through an air vent provided at an air vent portion, and another part of the cooling airflow passes through an exhaust port, a battery-installed surface, and an exhaust guide provided at the bottom surface, and is exhausted into the exhaust duct, through which it is exhausted to the outside of the vehicle. In other words, a part of air that has cooled the assembled battery is exhausted into the vehicle interior, and another part thereof is exhausted to the outside of the vehicle. However, air is exhausted into the vehicle interior in a single direction. Therefore, as described above, the temperature of air in the vehicle interior may rise locally in the vehicle interior. On the other hand, it is difficult to freely provide an exhaust duct in the hybrid vehicle for mounting a voluminous assembled battery, which has not been mounted on the conventional vehicle that relies solely on the internal combustion engine as its driving source. Depending on the position where the assembled battery is mounted, for example, there is also a case where air that has cooled the assembled battery must exclusively be exhausted into the vehicle interior. In such a case, the possibility of the local temperature rise of air in the vehicle interior may arise more remarkably.

SUMMARY OF THE INVENTION

The present invention has been made to solve the above-described problems. An object of the present invention is to provide a cooling device for an electric apparatus mounted on a vehicle, the cooling device being capable of avoiding a local temperature rise in the vehicle interior, without requiring a large space.

A cooling device according to an aspect of the present invention cools an electric apparatus mounted on a vehicle. The cooling device includes: an intake duct through which air is introduced into a housing accommodating the electric apparatus; and an exhaust duct through which air is exhausted from the housing. The exhaust duct allows air from the housing to be exhausted therethrough to a space formed by a plurality of vehicle frame members. A channel which penetrates the vehicle frame member and allows air exhausted from the housing to flow therethrough is formed in the vehicle frame member.

According to the cooling device configured as such, in the case where air that has cooled the assembled battery (battery for traveling purpose), which is an example of the electric apparatus mounted on the vehicle, is exhausted into the vehicle interior, air from the housing is exhausted through the exhaust duct to the closed space formed by the plurality of vehicle frame members (members, particularly cross members and side members). In this state, the exhaust air is exhausted to a closed space formed by the members (a space partitioned to a certain extent), and hence local temperature rise may occur. However, the channel penetrating the member and allowing air exhausted from the housing to flow therethrough is formed (formed so as not to incur a shortage of strength) in the member. Therefore, air exhausted from the housing is diffused through the channel in the member. The diffused air is exhausted from a lower part of the rear seat, a center tunnel, a scuff, and others into the vehicle interior or to the outside of the vehicle. As a result, it is possible to provide the cooling device for the electric apparatus mounted on the vehicle, the cooling device being capable of avoiding a local temperature rise in the vehicle interior, without requiring a large space.

A cooling device according to another aspect of the present invention includes: an intake duct through which air is introduced into a housing accommodating the electric apparatus; and an exhaust duct through which air is exhausted from the housing. The exhaust duct allows air from the housing to be exhausted therethrough to a space formed by a cushioning material provided between a floor carpet and a floor panel. A channel which penetrates the cushioning material and allows air exhausted from the housing to flow therethrough is formed inside the cushioning material.

According to the cooling device configured as such, in the case where air that has cooled the assembled battery (battery for traveling purpose), which is an example of the electric apparatus mounted on the vehicle, is exhausted into the vehicle interior, air from the housing is exhausted through the exhaust duct to a space formed by the cushioning material provided between the floor carpet and the floor panel. In this state, the exhaust air is exhausted to a closed space formed by the cushioning material (a space partitioned to a certain extent), and hence a local temperature rise may occur. However, the channel which penetrates the cushioning material and allows air exhausted from the housing to flow therethrough is formed (formed so as not to inhibit a cushioning function) inside the cushioning material. Therefore, air exhausted from the housing is diffused through the channel in the cushioning material. The diffused air is exhausted from the lower part of the rear seat, the center tunnel, the scuff, and others into the vehicle interior or to the outside of the vehicle. As a result, it is possible to provide the cooling device for the electric apparatus mounted on the vehicle, the cooling device being capable of avoiding a local temperature rise in the vehicle interior, without requiring a large space.

Preferably, a plurality of the channels allowing air exhausted from the housing to flow therethrough are formed inside the cushioning material.

According to the cooling device configured as such, the plurality of channels which allow air exhausted from the housing to flow therethrough are formed inside the cushioning material. Therefore, it is possible to further diffuse air exhausted from the housing.

Preferably, the channel which allows air exhausted from the housing to flow therethrough, which is branched inside the cushioning material, and which has a plurality of outlets, is formed inside the cushioning material.

According to the cooling device configured as such, the channel which is branched inside the cushioning material and has a plurality of outlets is formed inside the cushioning material. Therefore, it is possible to allow air exhausted from the housing to be diffused in more directions.

Preferably, the channel has a curved shape.

According to the cooling device configured as such, the channel formed inside the cushioning material is curved and can modify its flow direction. Therefore, it is possible to diffuse air exhausted from the housing in many directions.

Preferably, the cooling device further includes a draft-type fan on route of the exhaust duct.

According to the cooling device configured as such, the draft-type fan provided on route of the exhaust duct makes it possible to introduce cooling air through the intake duct into the housing which accommodates the electric apparatus.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will hereinafter be described with reference to the drawings. In the following description, the same parts are provided with the same reference characters, and have the same names and functions. Therefore, the detailed description thereof will not be repeated.

First Embodiment

Figure 1:
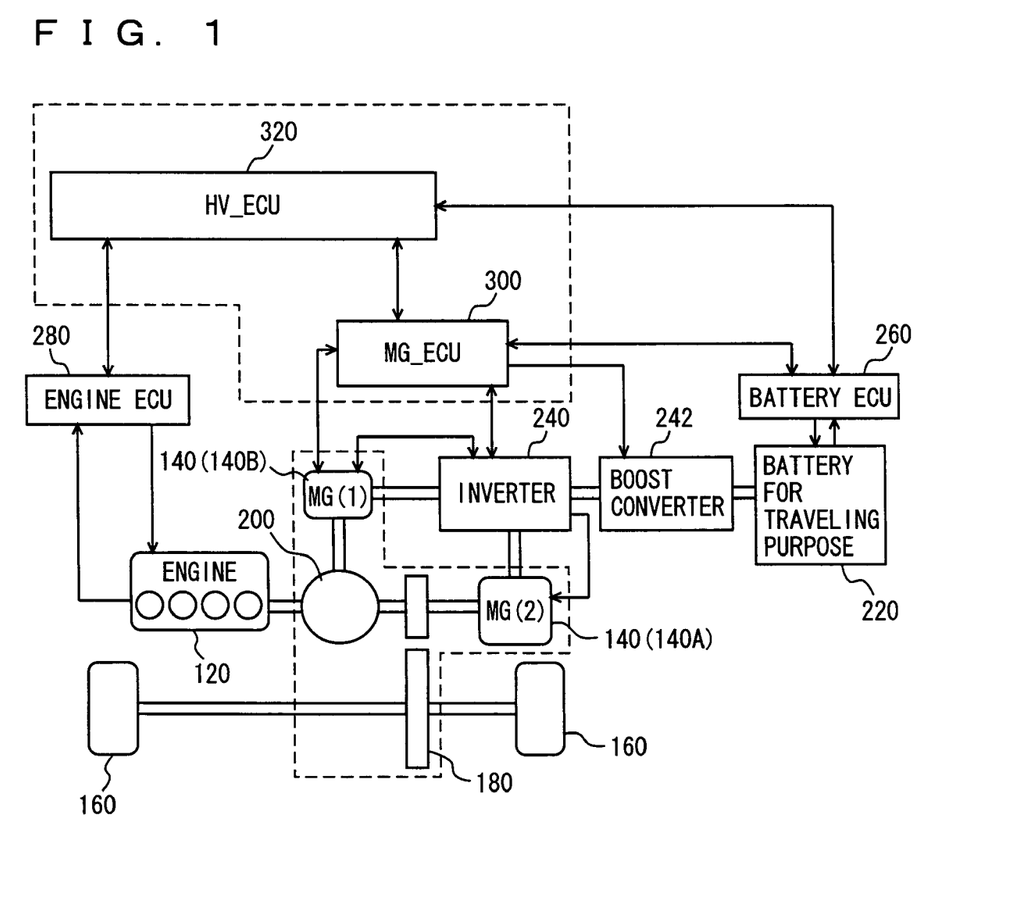
FIG. 1 is a control block diagram of an entire hybrid vehicle including a cooling device according to a first embodiment of the present invention.

With reference to FIG. 1, there will be described a control block diagram of the entire hybrid vehicle including a cooling device according to a first embodiment of the present invention. Note that the present invention is not limited to the hybrid vehicle shown in FIG. 1. The present invention is not limited to the hybrid vehicle as long as an internal combustion engine (hereinafter referred to as an engine for explanation), such as a gasoline engine that serves as a motive power source, functions as a driving source (traveling source) for causing the vehicle to travel, and also functions as a driving source for a generator. Furthermore, the present invention is not limited to the hybrid vehicle as long as the engine and the motor generator serve as driving sources, and the vehicle can travel by motive power of the motor generator (irrespective of whether the engine is stopped or not). The present invention may be applied to a hybrid vehicle mounted with a battery for traveling purpose and having another mode (and is not limited to hybrid vehicles of the so-called series-type, parallel-type, and others). An object to be cooled by the cooling device according to the present embodiment is a battery for traveling purpose. However, the present invention is not limited thereto. The object to be cooled may be an electric apparatus such as a capacitor serving as a power storage mechanism, a PCU, and the like, and is not limited to the battery for traveling purpose.

The battery is a nickel-hydrogen battery, a lithium-ion battery, or the like, and the type thereof is not particularly limited. In the following, the description will be made assuming that the type of the battery is a lithium-ion battery. Note that the lithium-ion battery has advantages that it has a high operating voltage and has high energy density per weight and volume and hence is made lightweight and compact, and that it has no memory effect. The structure of the battery will be described later in further detail.

As shown in FIG. 1, the hybrid vehicle includes an engine 120 and a motor generator (MG) 140. Note that, in the following, motor generator 140 is expressed as a motor generator 140A (or MG (2) 140A) and a motor generator 140B (or MG (1) 140B) for convenience of explanation. Depending on a traveling state of the hybrid vehicle, motor generator 140A functions as a generator, and motor generator 140B functions as a motor. When this motor generator functions as a generator, regenerative braking is performed. When the motor generator functions as a generator, kinetic energy of the vehicle is converted into electric energy, and a speed of the vehicle is reduced.

Additionally, the hybrid vehicle includes a speed reducer 180 that transmits motive power generated at engine 120 and motor generator 140 to a driving wheel 160, and transmits driving power of driving wheel 160 to engine 120 and motor generator 140, a power split device (e.g. a planetary gear mechanism described below) 200 that distributes motive power generated by engine 120 to two paths, namely, driving wheel 160 and motor generator 140B (MG (1) 140B), a battery 220 for traveling purpose that stores electric power for driving motor generator 140, an inverter 240 that provides current control by providing conversion between a direct current of battery 220 for traveling purpose and an alternating current of motor generator 140A (MG (2) 140A) and motor generator 140B (MG (1) 140B), a battery control unit (hereinafter referred to as a battery ECU (Electronic Control Unit)) 260 that manages and controls a charging/discharging state (e.g. SOC) of battery 220 for traveling purpose, an engine ECU 280 that controls an operational state of engine 120, an MG_ECU 300 that controls motor generator 140, battery ECU 260, inverter 240, and others in accordance with the state of the hybrid vehicle, an HV_ECU 320 that manages and controls battery ECU 260, engine ECU 280, MG_ECU 300, and others in an interrelated manner to thereby control the entire hybrid system such that the hybrid vehicle can run most efficiently, and others. Note that the SOC is calculated by measurement of the integral of the current and measurement of an Open Circuit Voltage (OCV).

In the present embodiment, a boost converter 242 is provided between battery 220 for traveling purpose and inverter 240. This is because a rated voltage of battery 220 for traveling purpose is lower than the rated voltages of motor generator 140A (MG (2) 140A) and motor generator 140B (MG (1) 140B), and hence when electric power is supplied from battery 220 for traveling purpose to motor generator 140A (MG (2) 140A) and motor generator 140B (MG (1) 140B), boost converter 242 steps up a voltage of electric power.

Although each of the ECUs in FIG. 1 is separately configured, the ECUs may be configured such that at least two ECUs may be integrated into an ECU (e.g. as shown by a dashed line in. FIG. 1, an ECU in which MG_ECU 300 and HV_ECU 320 are integrated is an example thereof).

Power split device 200 uses a planetary gear mechanism (planetary gear) for allocating motive power of engine 120 to both of driving wheel 160 and motor generator 140B (MG (1) 140B). By controlling the rotation speed of motor generator 140B (MG (1) 140B), power split device 200 also functions as a continuously variable transmission. Torque of engine 120 is input to a carrier (C), and the input torque is transmitted to motor generator 140B (MG (1) 140B) by a sun gear (S), and transmitted to motor generator 140A (MG (2) 140A) and an output shaft (the side of driving wheel 160) by a ring gear (R). When the rotating engine 120 is to be stopped, engine 120 is still rotating, and hence the kinetic energy of this rotation is converted into electric energy by motor generator 140B (MG (1) 140B) to thereby reduce the rotation speed of engine 120.

In the hybrid vehicle mounted with the hybrid system as shown in FIG. 1, if a condition predetermined as to a state of the vehicle is established, HV_ECU 320 controls engine 120 via motor generator 140A (MG (2) 140A) and engine ECU 280 such that the hybrid vehicle travels only by motor generator 140A (MG (2) 140A) in motor generator 140. For example, the predetermined condition is a condition that the SOC of battery 220 for traveling purpose is at least a predetermined value, or the like. By doing so, when the vehicle is started, travels at a low speed, or the like and the use of engine 120 is inefficient, it is possible to allow the hybrid vehicle to travel only by motor generator 140A (MG (2) 140A). As a result, it is possible to lower the SOC of battery 220 for traveling purpose (it is possible to charge battery 220 for traveling purpose when the vehicle stops subsequently).

During normal traveling, motive power of engine 120 is divided into two paths by power split device 200, for example, so that one half is used to directly drive driving wheel 160, and the other half is used to drive motor generator 140B (MG (1) 140B) for power generation. At that time, the generated electric power is used to drive motor generator 140A (MG (2) 140A) to assist driving of driving wheel 160. During traveling at a high speed, electric power from battery 220 for traveling purpose is further supplied to motor generator 140A (MG (2) 140A) to thereby increase power of motor generator 140A (MG (2) 140A), so that driving force is further added to driving wheel 160. In contrast, at deceleration, motor generator 140A (MG (2) 140A), which is operated by driving wheel 160 in a driven manner, functions as a generator for regenerative power generation, and the recovered electric power is stored in battery 220 for traveling purpose. Note that if a charged amount of battery 220 for traveling purpose is reduced and charging is particularly required, power of engine 120 is increased and an amount of electric power to be generated by motor generator 140B (MG (1) 140B) is increased, to thereby increase an amount of electric power to be charged in battery 220 for traveling purpose.

The target SOC of battery 220 for traveling purpose is usually set at approximately 60% so as to make it possible to recover energy at any time, whenever regeneration is performed. Furthermore, as to the upper limit value and the lower limit value of the SOC, the upper limit value is set at 80% and the lower limit value is set at 30%, for example, to suppress degradation of battery 220 for traveling purpose. HV_ECU 320 controls power generation and regeneration by motor generator 140 and a motor power of motor generator 140, via MG_ECU 300, such that the SOC is kept at or below the upper limit value and at or above the lower limit value. Note that the value discussed here is only an example and is not a value particularly limited.

Figure 2:
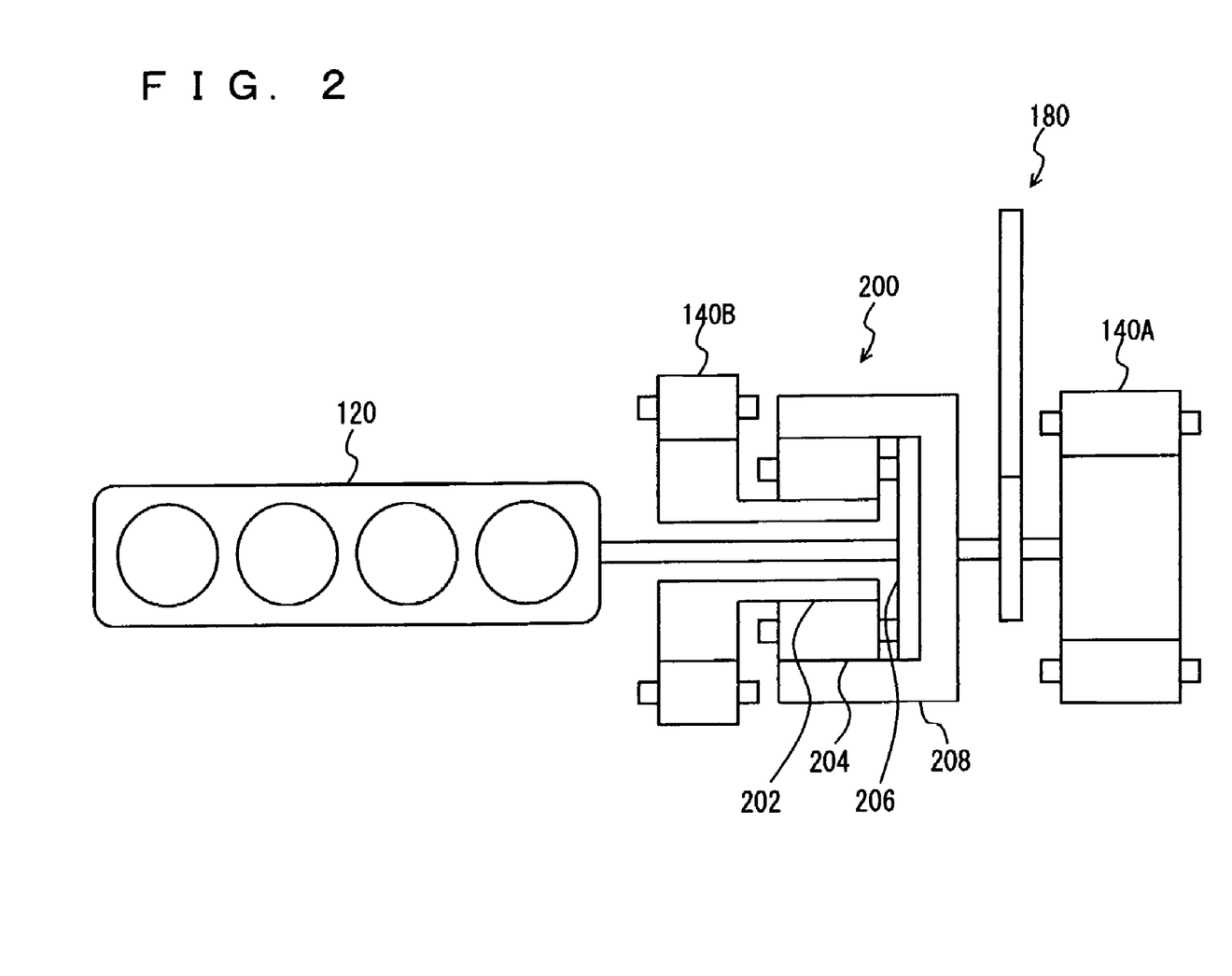
FIG. 2 is a diagram that shows a power split device.

With reference to FIG. 2, power split device 200 will further be described. Power split device 200 is configured with a planetary gear including a sun gear (S) 202 (hereinafter simply referred to as sun gear 202), a pinion gear 204, a carrier (C) 206 (hereinafter simply referred to as carrier 206), and a ring gear (R) (208) (hereinafter simply referred to as ring gear 208).

Pinion gear 204 engages with sun gear 202 and ring gear 208. Carrier 206 rotatably supports pinion gear 204. Sun gear 202 is coupled to a rotary shaft of MG (1) 140B. Carrier 206 is coupled to a crankshaft of engine 120. Ring gear 208 is coupled to a rotary shaft of MG (2) 140A and speed reducer 180.

Engine 120, MG (1) 140B, and MG (2) 140A are coupled via power split device 200 formed of a planetary gear, so that rotation speeds of engine 120, MG (1) 140B, and MG (2) 140A have a relation connected with a straight line in a nomographic chart.

Figure 3:
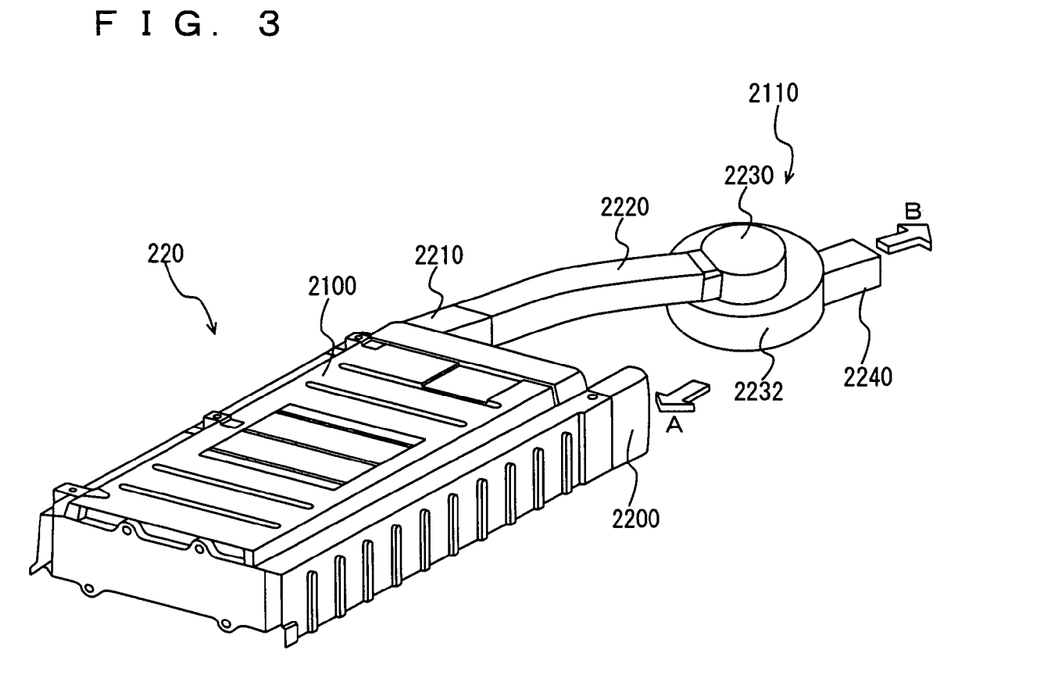
FIG. 3 is a general perspective view of a battery for traveling purpose identified as an object to be cooled by the cooling device according to the first embodiment of the present invention.

With reference to FIG. 3, battery 220 for traveling purpose in FIG. 1 will be described. The type of battery that configures battery 220 for traveling purpose is a lithium-ion battery as described above.

Battery 220 for traveling purpose shown in FIG. 3 is provided, for example, at the rear seat, or under a sheet of the luggage compartment, of the vehicle (on the floor panel). Battery 220 for traveling purpose is configured with a lithium-ion battery (battery pack) accommodated inside a battery pack cover 2100, and an electric-powered battery cooling fan 2110 that draws in air for cooling the battery pack into battery pack cover 2100. As to battery 220 for traveling purpose shown in FIG. 3, the so-called draft type is adopted in which electric-powered battery cooling fan 2110 is provided in an air exhaust path. Therefore, air is drawn in along a direction of an arrow A and exhausted along a direction of an arrow B in FIG. 3.

Note that a connecting portion of wirings that connect the lithium-ion battery to the motor generators and others via a DC/DC converter and an inverter may be accommodated inside battery pack cover 2100, in addition to the battery pack. The connecting portion is referred to as a junction box.

Generally in the lithium-ion battery, a lithium-containing compound such as cobalt-based lithium, nickel-based lithium, or lithium manganate is used for a positive electrode, a carbon material that does not contain lithium is used for a negative electrode, lithium salt dissolved in an organic solvent is used for an electrolytic solution, and lithium is used as ions. The lithium-ion battery that uses nickel-based lithium for the positive electrode, in particular, can achieve prolonged lifetime at high temperatures, and can also achieve high power and prolonged lifetime at low temperatures by suppressing a deteriorative reaction between the electrolytic solution and the positive electrode at an electrolytic interface. Such a lithium-ion battery has a high operating voltage and has high energy density per weight and volume, and hence can easily be made lightweight and compact.

When the lithium-ion battery is at a high temperature, electric-powered battery cooling fan 2110 draws in air in the vehicle interior and introduces the air into a cooling passage provided in battery pack cover 2100, to thereby cool the lithium-ion battery. The lithium-ion battery delivers the highest performance at approximately normal temperature. Therefore, if the temperature measured by a battery temperature sensor is higher than a predetermined threshold value, electric-powered battery cooling fan 2110, ability of which can be modified by controlling the rotation speed of the electric-powered motor, uses air inside the vehicle interior as a cooling medium, so that the lithium-ion battery is cooled to ensure battery performance.

Note that battery ECU 260 shown in FIG. 1 manages charging/discharging, and deals with abnormal events, of the lithium-ion battery mounted as such. Battery ECU 260 executes SOC management control, SOC equalization management control, and battery temperature control so as to bring the SOC of the lithium-ion battery at an appropriate value.

In the SOC management control, the SOC of the lithium-ion battery is managed in accordance with a traveling state of the vehicle. For example, the SOC is managed such that the electric power generated by the motor generator during regenerative braking can be stored (i.e. such that the battery is not in a fully-charged state).

In the SOC equalization management control, if a plurality of electric cells (battery cells) are used as a set of battery pack, the SOCs of the battery cells are equalized and the usage range of the SOC of the battery pack serving as a set battery is maximized, so as to effectively use the stored electric power. Therefore, if the SOCs of the battery cells vary, in accordance with the battery cell having the lowest SOC, other battery cells are discharged for equalization.

The lithium-ion battery delivers the highest performance at approximately normal temperature. Therefore, in the battery temperature control, if the temperature of the lithium-ion battery rises, electric-powered battery cooling fan 2110 is used to lower the battery temperature to an appropriate temperature.

Figure 4:
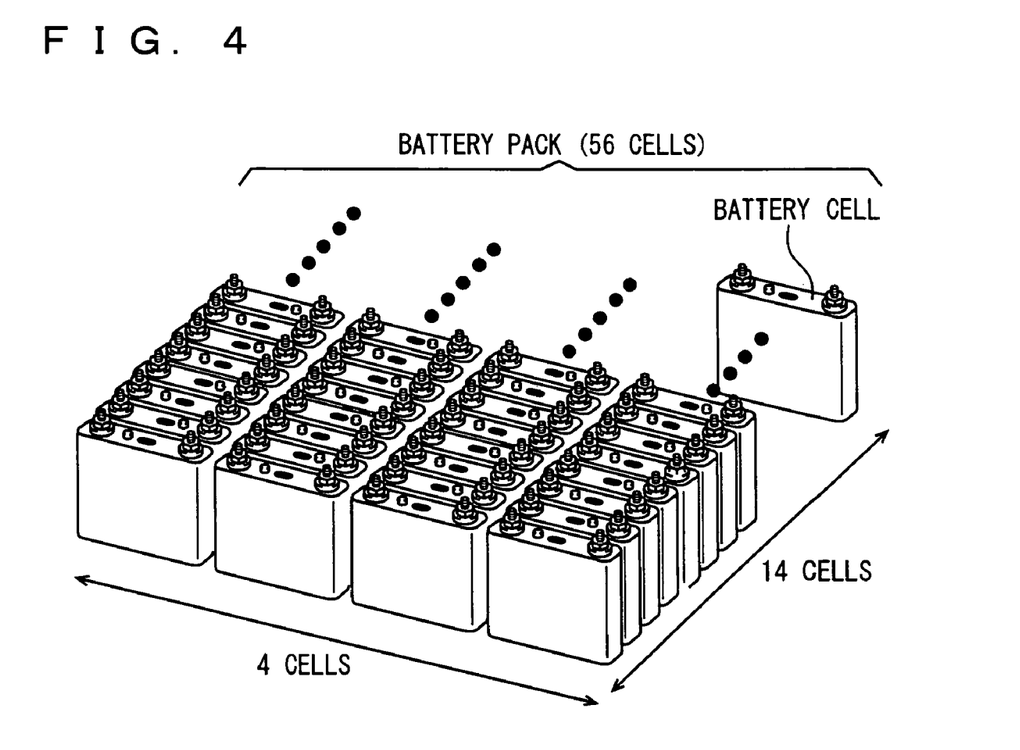
FIG. 4 is a general perspective view of a battery pack configured with lithium-ion batteries.

FIG. 4 shows an internal structure of the lithium-ion battery. As shown in FIG. 4, the lithium-ion battery is formed of 56 battery cells (here 14 cells×4 cells) connected in series, each battery cell having an output voltage of approximately 3-4 V. Note that the shape of the battery cell is not limited to a square type, and may be a cylindrical type or other shapes.

Furthermore, the number of battery cells that configure the battery pack is not limited either.

Figure 5:
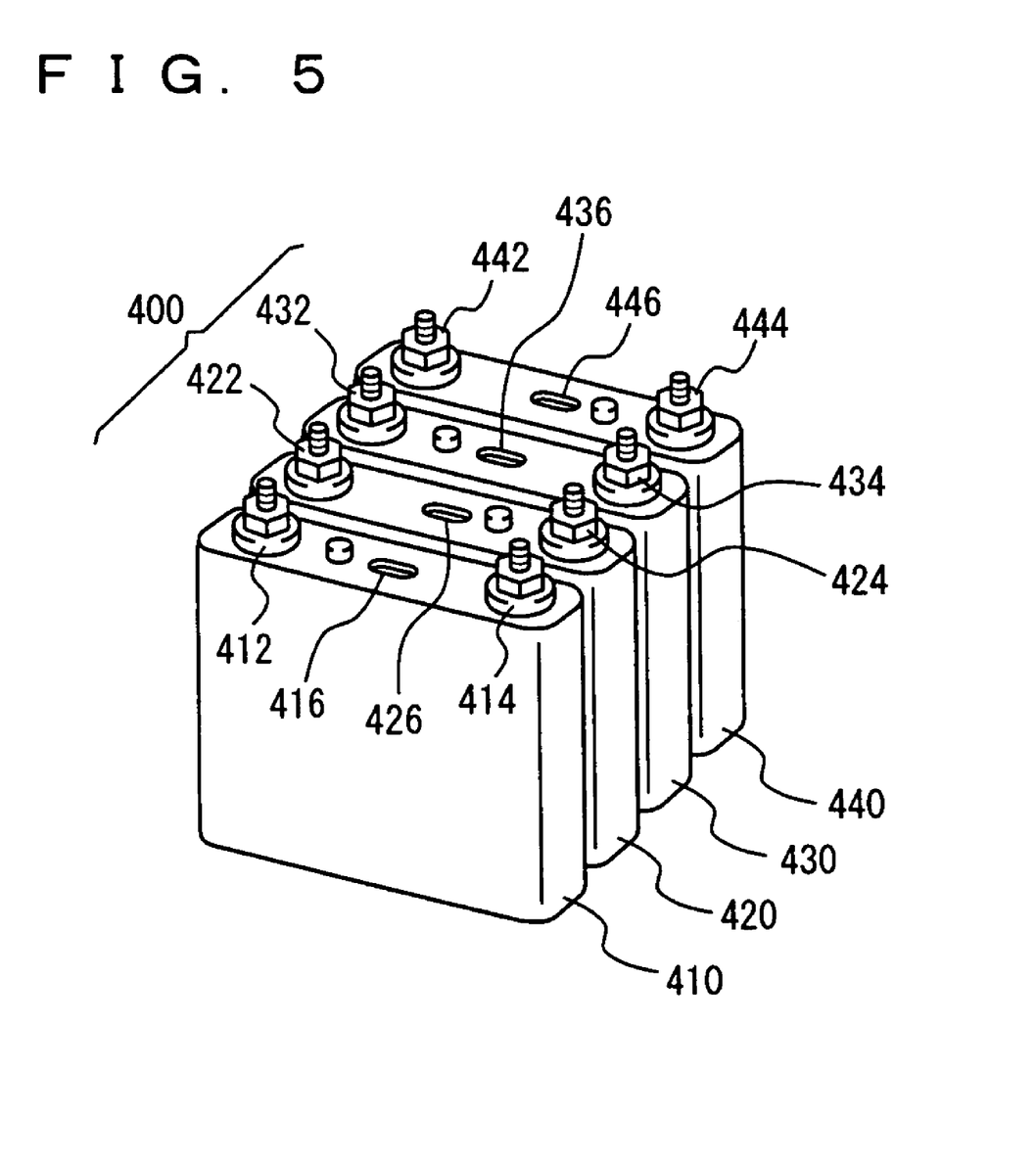
FIG. 5 is a partially enlarged view of FIG. 4.

FIG. 5 shows an internal structure of a battery module 400 configured with four battery cells in the lithium-ion battery in FIG. 4. Note that the battery module is not limited to a battery module configured with four battery cells. As shown in FIG. 5, battery module 400 is configured with four battery cells 410, 420, 430, and 440 connected in series. Note that in the present invention, the number of battery cells that configure the battery module may be one, four as described, or more than one other than four. The number of battery cells is modified by the number of battery cells that configure the battery pack, the number of rows for configuring the battery pack, the number of cells in a single row, or the like.

On top surfaces of battery cells 410, 420, 430, 440, positive or negative terminals 412, 414, 422, 424, 432, 434, 442, 444 are provided. With the use of these terminals, the four battery cells are connected in series.

On the top surfaces of battery cells 410, 420, 430, 440, safety valves 416, 426, 436, 446 are also provided. Such safety valves 416, 426, 436, 446 allow the gas generated inside the lithium-ion battery when it is used in an abnormal state, to be exhausted therethrough. For example, when the battery is brought into an abnormal state (when the battery is discharged at a large current or overcharged), gas may be generated inside the battery, and an internal pressure of the battery may abnormally be increased. In such a state, the safety valve is opened to exhaust the gas, so as to prevent breakage of the battery case by the internal pressure.

The lithium-ion battery has a temperature switch (temperature fuse) embedded therein for interrupting a current when the battery temperature rises to an abnormally high temperature. The temperature switch is disposed to be in contact with the battery so as to accurately detect the battery temperature. A temperature fuse is used as the temperature switch, and is connected in series with the battery, and hence when the battery temperature becomes abnormally high, the temperature fuse is turned off to interrupt a current. When the battery temperature is lowered, the temperature fuse is turned on and the battery is brought into a usable state again. The temperature switch is provided at each of the battery cells, and is configured such that when the temperature of the battery cell reaches 85° C., for example, it transmits an ON signal to battery ECU 260.

Furthermore, a temperature sensor that measures a temperature of the battery pack in battery 220 for traveling purpose is provided, for example, at a position under the worst temperature environment in battery 220 for traveling purpose (e.g. a position where the cooling airflow flows poorly and/or a temperature of the cooling airflow is high).

Furthermore, as shown in FIG. 4 and FIG. 5, the battery cells are installed at intervals (with air flowing paths ensured) such that air (in the vehicle interior, a temperature of which is adjusted by an air conditioner) serving as a cooling medium can flow therethrough. The intervals may be uniform or non-uniform.

Figure 6:
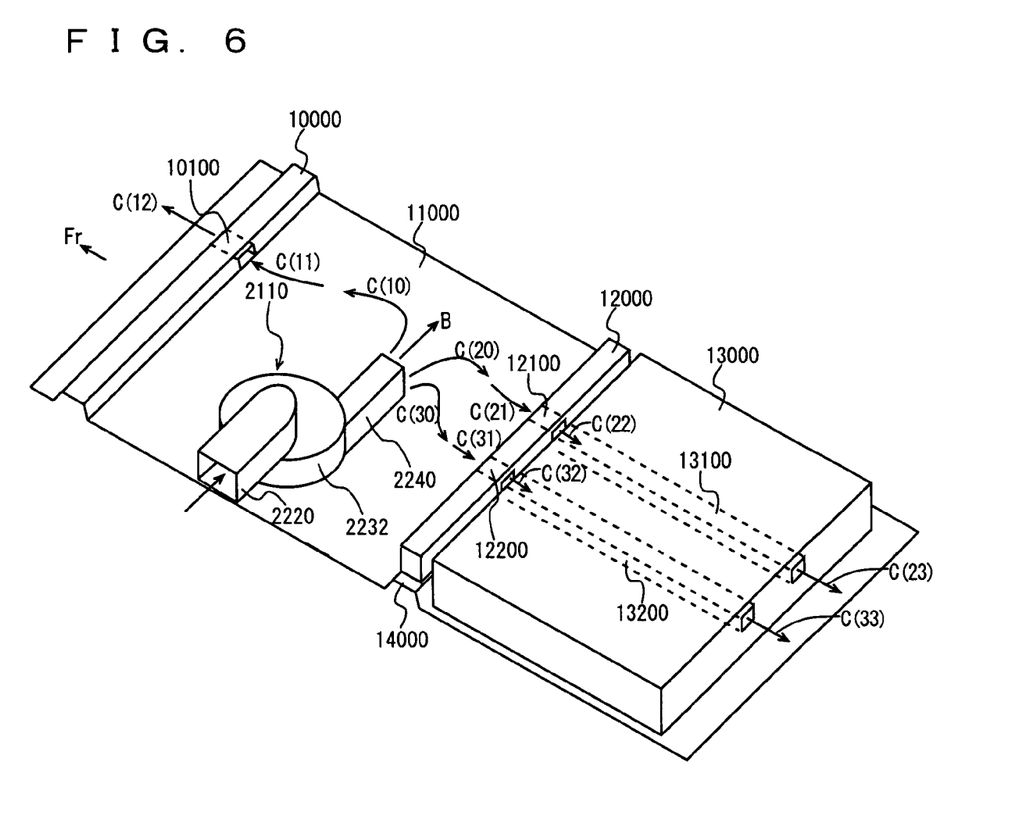
FIG. 6 is a top perspective view of the cooling device according to the first embodiment of the present invention.
Figure 7:
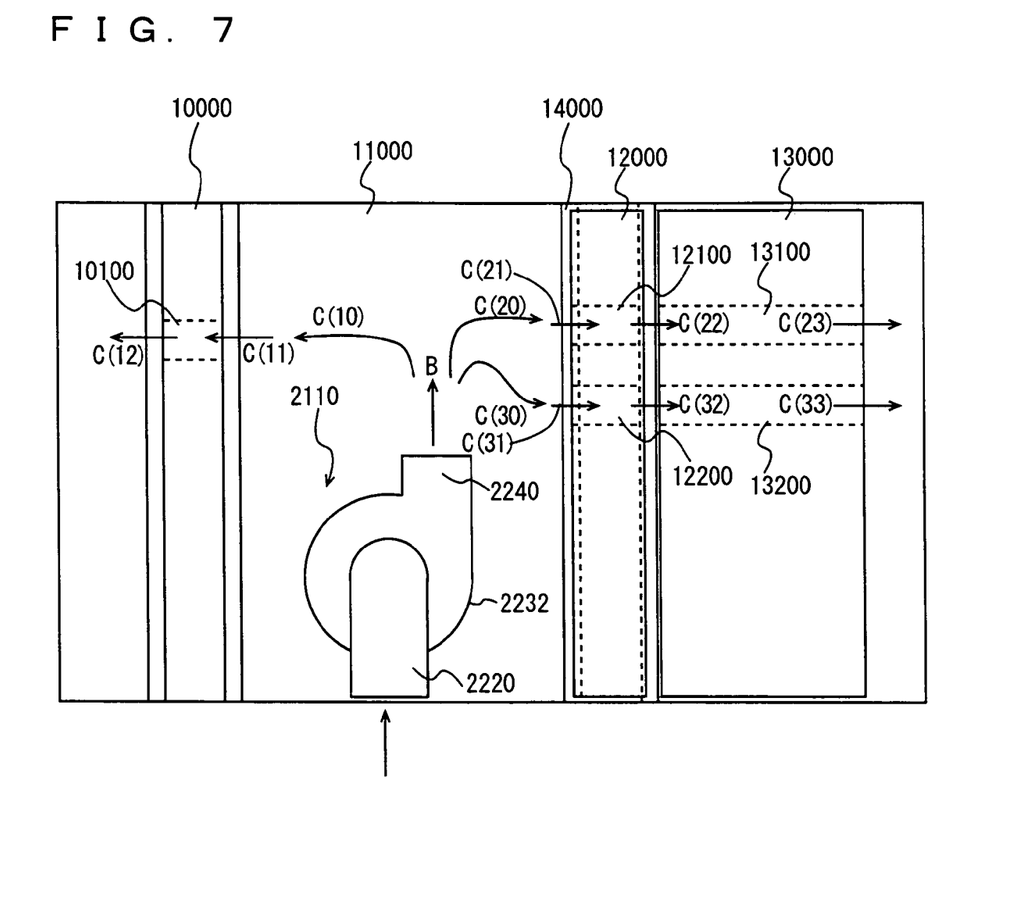
FIG. 7 is a top view of FIG. 6.

With reference to FIG. 6 and FIG. 7, there is described a cooling device according to the present embodiment, which cooling device allows a flow of air exhausted from electric-powered battery cooling fan 2110 to diffuse. Note that the upper left direction in FIG. 6 represents the frontward direction of the vehicle. Furthermore, FIG. 7 is a top view of FIG. 6.

As shown in FIG. 6 and FIG. 7, electric-powered battery cooling fan 2110 includes a motor that rotates a rotor blade, the rotor blade that is rotated by the motor, a rotor blade cover 2232 that accommodates the rotor blade, and an exhaust duct 2240.

In the vehicle mounted with the cooling device, a first cross member (e.g. second cross member) 10000 and a second cross member (e.g. rear seat cross member) 14000 are formed on a floor panel 11000, as in the normal vehicle.

First cross member 10000, which is a cross member on a front side of the vehicle, is provided with a ventilating opening 10100 so as not to cause structural problems for the vehicle (so as not to incur a shortage of strength from a structural viewpoint).

On second cross member 14000, which is a cross member on a rear side of the vehicle, and on floor panel 11000, there are provided a cushioning material 12000 and a cushioning material 13000, respectively. Cushioning material 12000 and cushioning material 13000 are provided between floor panel 11000 and the floor carpet.

Cushioning material 12000, which is provided on second cross member 14000, is provided with a first ventilating opening 12100 and a second ventilating opening 12200. Furthermore, as in the case of first cross member 10000, second cross member 14000 may also be provided with a ventilating opening.

Cushioning material 13000 is provided with a first ventilating duct 13100 at a position corresponding to first ventilating opening 12100, and a second ventilating duct 13200 at a position corresponding to second ventilating opening 12200. If second cross member 14000 is provided with a ventilating opening, cushioning material 13000 is provided with a ventilating duct at a position corresponding to the ventilating opening in second cross member 14000.

With reference to FIG. 6 and FIG. 7, there will be described a flow of air exhausted from electric-powered battery cooling fan 2110 in the cooling device structured as such and according to the present embodiment.

As shown in an arrow B in FIG. 6 and FIG. 7, air exhausted through exhaust duct 2240 flows into a closed space (a space partitioned to a certain extent) formed by the cross members and the cushioning material. In the cooling device according to the present embodiment, the exhaust air can be diffused. In the cooling device according to the present embodiment, three directions for diffusion are adopted as follows.

(a) The air exhausted through exhaust duct 2240 flows in a direction to ventilating opening 10100 provided in first cross member 10000, as shown by an arrow C (10), then flows in the direction to ventilating opening 10100, as shown by an arrow C (11), and further flows in a direction shown by an arrow C (12) along which the air passes through ventilating opening 10100. Note that, at that time, a static pressure of air on the front side of the vehicle with respect to first cross member 10000 is lower than a static pressure of air in the closed space (space partitioned to a certain extent) formed by the cross members and the cushioning material, and hence the air exhausted through exhaust duct 2240 flows in the direction of arrow C (10), as well as the direction of arrow B.

(b) The air exhausted through exhaust duct 2240 flows in a direction to first ventilating opening 12100 in cushioning material 12000 provided on second cross member 14000, as shown by an arrow C (20), then flows in the direction of ventilating opening 12100, as shown by an arrow C (21), further flows in a direction shown by an arrow C (22) along which the air passes through ventilating duct 13100 provided in cushioning material 13000, and further flows in a direction shown by an arrow C (23) along which the air is exhausted through ventilating duct 13100.

(c) The air exhausted through exhaust duct 2240 flows in a direction to second ventilating opening 12200 in cushioning material 12000 provided on second cross member 14000, as shown by an arrow C (30), then flows in the direction to ventilating opening 12200, as shown by an arrow C (31), further flows in a direction shown by an arrow C (32) along which the air passes through ventilating duct 13200 provided in cushioning material 13000, and further flows in a direction shown by an arrow C (33) along which the air is exhausted through ventilating duct 13200.

Note that, in each of the cases (b) and (c) as described above, a static pressure of air on the rear side of the vehicle with respect to second cross member 14000 is lower than a static pressure of air in the closed space (space partitioned to a certain extent) formed by the cross members and the cushioning material, and hence the air exhausted through exhaust duct 2240 flows in the directions of arrow C (20) and arrow C (30), as well as the direction of arrow B.

Furthermore, each of the exhaust airflow shown by arrow C (12), the exhaust airflow shown by arrow C (23), and the exhaust airflow shown by arrow C (33) is exhausted from the lower part of the rear seat, the center tunnel, the scuff, or the like, adjacent thereto, into the vehicle interior or to the outside of the vehicle.

As described above, with the cooling device according to the present embodiment, the cross member is provided with the ventilating opening, and the cushioning materials provided under the floor carpet are provided with the ventilating opening and the ventilating duct, so that the air exhausted through exhaust duct 2240 of electric-powered battery cooling fan 2110 can be diffused. In this case, there is no need to specially provide an independent duct specifically designed for exhaust air, and hence an additional space is not required.

In the first embodiment described above, first ventilating duct 13100 and second ventilating duct 13200 provided in cushioning material 13000 are straight. However, these ventilating ducts may be bent on route thereof in the upward and downward directions of the sheet of FIG. 6, or may be branched in the upward and downward directions of the sheet of FIG. 6.

Second Embodiment

Figure 8:
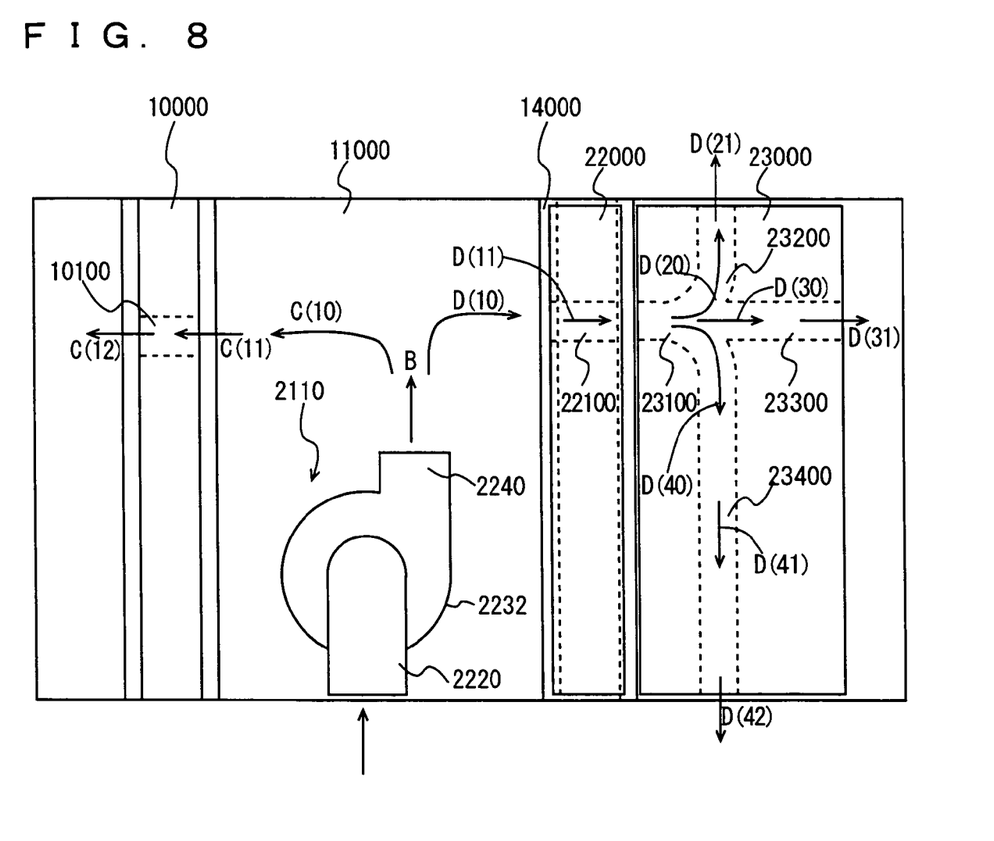
FIG. 8 is a top view of a cooling device according to a second embodiment of the present invention.

With reference to FIG. 8, there will be described a cooling device according to a second embodiment of the present invention. Note that the present embodiment has the same configurations as those of the first embodiment described above with regard to FIGS. 1-5. Therefore, the detailed description thereof will not be repeated here. Furthermore, in the top view shown in FIG. 8, the same configurations as those in FIG. 7 above are provided with the same reference characters, and have the same functions as well. Therefore, the detailed description thereof will not be repeated here.

FIG. 8 is a top view that corresponds to FIG. 7 in the first embodiment described above. The cooling device according to the present embodiment is of the so-called draft type as well, in which an electric-powered battery cooling fan is provided in an air exhaust path. Therefore, air is exhausted in the direction shown by arrow B in FIG. 8.

The cooling device according to the present embodiment differs from the cooling device according to the first embodiment described above on the two points. Firstly, a cushioning material 22000 installed on top of second cross member 14000 has only a single ventilating opening. Secondly, a ventilating duct in a cushioning material 23000 has one inlet port and three outlet ports, and the ventilating duct is branched inside cushioning material 23000.

Stated differently, in the present embodiment, ventilating opening 10100 is provided in first cross member 10000, as in the first embodiment. However, a flow of air exhausted to the rear side of the vehicle is different from that of the first embodiment.

As shown in FIG. 8, cushioning material 22000 provided on second cross member 14000 is provided with a single ventilating opening 22100. Cushioning material 23000 is provided with a ventilating duct 23100 at a position corresponding to ventilating opening 22100.

Inside cushioning material 23000, ventilating duct 23100 is branched in three directions. Ventilating duct 23100 is branched into a ventilating diversion duct 23200 extending to the upward direction of the sheet of FIG. 8, a ventilating diversion duct 23300 extending to the right direction of the sheet of FIG. 8 (the rearward direction of the vehicle), and a ventilating diversion duct 23400 extending to the downward direction of the sheet of FIG. 8.

Note that ventilating duct 23100 is provided at a position of cushioning material 23000, which position corresponds to the position of ventilating opening 22100.

With reference to FIG. 8, there will be described a flow of air exhausted from electric-powered battery cooling fan 2110 in the cooling device structured as such and according to the present embodiment. Note that the above-described flow (a) of air is the same, and hence the detailed description thereof will not be repeated here.

As shown by arrow B in FIG. 8, the air exhausted through exhaust duct 2240 flows into the closed space (space partitioned to a certain extent) formed by the cross members and the cushioning material. In the cooling device according to the present embodiment, the exhausted air can be diffused in directions including a direction to a lateral side of the vehicle. In the cooling device according to the present embodiment, three directions for diffusion are adopted as follows.

(d-1) The air exhausted through exhaust duct 2240 flows in a direction to second ventilating opening 22100 in cushioning material 22000 provided on second cross member 14000, as shown by an arrow D (10), then flows in the direction to ventilating opening 22100, as shown by an arrow D (11), and is further introduced into ventilating duct 23100 provided in cushioning material 23000. Inside cushioning material 23000, the air flows to a lateral side of the vehicle, as shown by an arrow D (20), and further flows in a direction shown by an arrow D (21) along which the air is exhausted through ventilating diversion duct 23200.

(d-2) The air introduced into ventilating duct 23100 provided in cushioning material 23000 flows inside cushioning material 23000 to the rear side of the vehicle, as shown by an arrow D (30), and is further exhausted in a direction shown by an arrow D (31) through ventilating diversion duct 23300.

(d-3) The air introduced into ventilating duct 23100 provided in cushioning material 23000 flows inside cushioning material 23000 to a lateral side of the vehicle, as shown by an arrow D (40) (the lateral side different from (d-1) described above), further flows through ventilating diversion duct 23400, as shown by an arrow D (41), and is exhausted in a direction shown by an arrow D (42).

Note that, in each of the above-described cases (d-1)-(d-3), a static pressure of air on the rear side of the vehicle with respect to second cross member 14000 is lower than a static pressure of air in the closed space (space partitioned to a certain extent) formed by the cross members and the cushioning material, and hence the air exhausted through exhaust duct 2240 flows in the direction of arrow D (10), as well as in the direction of arrow B.

Furthermore, each of the exhaust airflow shown by arrow D (21), the exhaust airflow shown by arrow D (31), and the exhaust airflow shown by arrow D (42) is exhausted from the lower part of the rear seat, the center tunnel, the scuff, or the like, adjacent thereto, into the vehicle interior or to the outside of the vehicle.

As described above, with the cooling device according to the present embodiment, the cushioning materials provided on the cross member and under the floor carpet are provided with the ventilating opening and the ventilating diversion duct, so that the air exhausted through exhaust duct 2240 of electric-powered battery cooling fan 2110 can be diffused. In this case, there is no need to specially provide an independent duct specifically designed for exhaust air, and no additional space is required.

Third Embodiment

Figure 9:
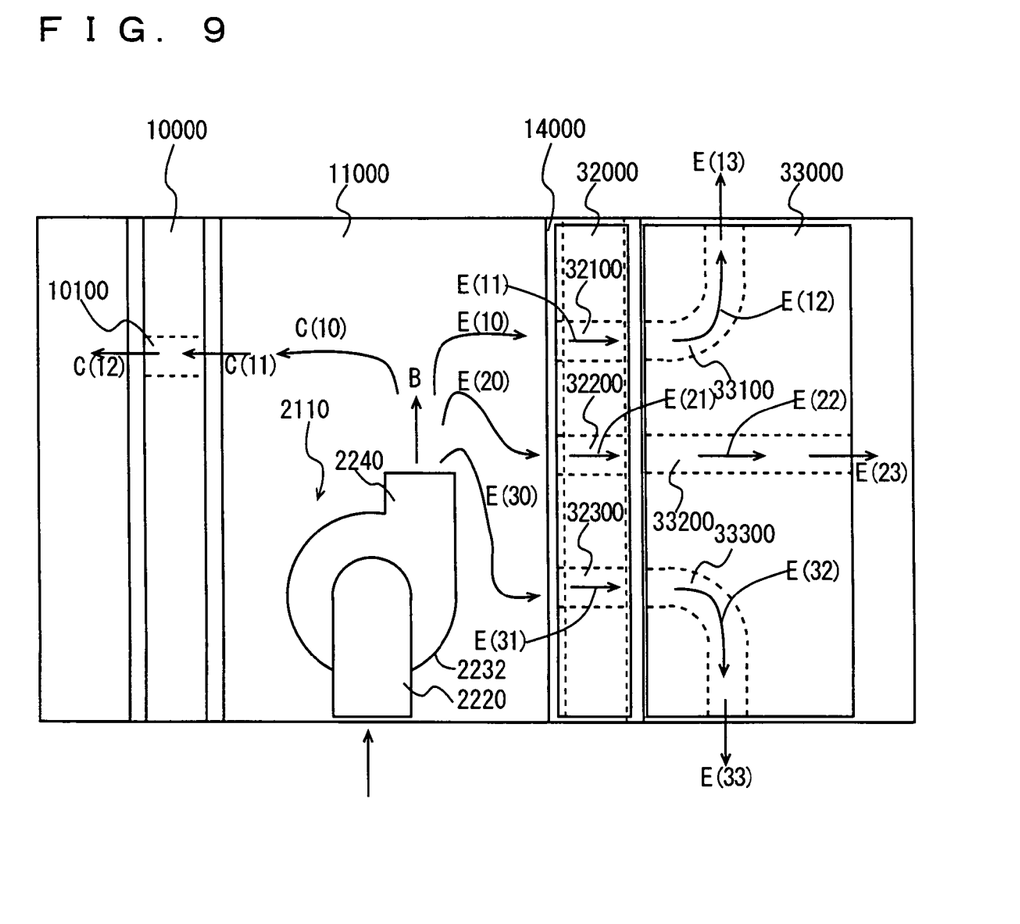
FIG. 9 is a top view of a cooling device according to a third embodiment of the present invention.

With reference to FIG. 9, a cooling device according to a third embodiment of the present invention will be described. Note that the present embodiment has the same configurations as those of the first embodiment described above with regard to FIGS. 1-5, as in the second embodiment. Therefore, the detailed description thereof will not be repeated here. Furthermore, in the top view shown in FIG. 9, the same configurations as those in FIG. 7 described above are provided with the same reference characters, and have the same functions as well. Therefore, the detailed description thereof will not be repeated here.

FIG. 9 is a top view that corresponds to FIG. 7 in the first embodiment described above and FIG. 8 in the second embodiment described above. The cooling device according to the present embodiment is of the so-called draft type as well, in which an electric-powered battery cooling fan is provided in an air exhaust path. Therefore, air is exhausted in the direction of arrow B in FIG. 8.

The cooling device according to the present embodiment differs from the cooling device according to the second embodiment described above on three points. Firstly, a cushioning material 32000 installed on top of second cross member 14000 has three ventilating openings. Secondly, ventilating ducts are provided at positions (three sites) of a cushioning material 33000, which positions correspond to the three ventilating openings, respectively. Thirdly, the ventilating ducts in cushioning material 33000 are bent (curved) without being branched.

Stated differently, in the present embodiment, first cross member 10000 is provided with ventilating opening 10100 as in the first embodiment. However, the flow of air exhausted to the rear side of the vehicle differs from that of the first embodiment. Although the flow of air exhausted to the rear side of the vehicle is the same as that of the second embodiment, the present embodiment has a different structure.

As shown in FIG. 9, a cushioning material 32000 provided on second cross member 14000 is provided with three ventilating openings, namely, a ventilating opening 32100, a ventilating opening 32200, and a ventilating opening 32300. Cushioning material 33000 is provided with a curved ventilating duct 33100 at a position corresponding to ventilating opening 32100, a straight ventilating duct 33200 at a position corresponding to ventilating opening 32200, and a curved ventilating duct 33000 at a position corresponding to ventilating opening 32300.

Inside cushioning material 33000, ventilating duct 33200 is straight. However, ventilating duct 33100 is curved to the lateral side of the vehicle (to the upward of the sheet of FIG. 9), while ventilating duct 33300 is curved to the lateral side of the vehicle (to the downward of the sheet of FIG. 9).

With reference to FIG. 9, there will be described a flow of air exhausted from electric-powered battery cooling fan 2110 in the cooling device structured as such and according to the present embodiment. Note that the above-described flow (a) of air is the same, and hence the detailed description thereof will not be repeated here.

As shown by arrow B in FIG. 9, the air exhausted through exhaust duct 2240 flows into the closed space (space partitioned to a certain extent) formed by the cross members and the cushioning material. In the cooling device according to the present embodiment, the exhausted air can be diffused in directions that include a direction to a lateral side of the vehicle, without allowing the air to be diverted inside cushioning material 33000. In the cooling device according to the present embodiment, three directions for diffusion are adopted as follows.

(e-1) The air exhausted through exhaust duct 2240 flows in a direction to first ventilating opening 32100 in cushioning material 32000 provided on second cross member 14000, as shown by an arrow E (10), then flows in the direction to ventilating opening 32100, as shown by an arrow E (11), further flows in a direction shown by an arrow E (12) along which the air passes through curved ventilating duct 33100 provided in cushioning material 33000, and further flows in a direction shown by an arrow E (13) along which the air is exhausted through curved ventilating duct 33100.

(e-2) The air exhausted through exhaust duct 2240 flows in a direction to second ventilating opening 32200 in cushioning material 32000 provided on second cross member 14000, as shown by an arrow E (20), then flows in the direction to ventilating opening 32200, as shown by an arrow E (21), further flows in a direction shown by an arrow E (22) along which the air passes through straight ventilating duct 33200 provided in cushioning material 33000, and further flows in a direction shown by an arrow E (23) along which the air is exhausted through straight ventilating duct 33200.

(e-3) The air exhausted through exhaust duct 2240 flows in a direction to third ventilating opening 32300 in cushioning material 32000 provided on second cross member 14000, as shown by an arrow E (30), then flows in the direction to ventilating opening 32300, as shown by an arrow E (31), further flows in a direction shown by an arrow E (32) along which the air passes through curved ventilating duct 33300 provided in cushioning material 33000, and further flows in a direction shown by an arrow E (33) along which the air is exhausted through curved ventilating duct 33300.

Note that in each of the above-described cases (e-1)-(e-3), a static pressure of air on the rear side of the vehicle with respect to second cross member 14000 is lower than a static pressure of air in the closed space (space partitioned to a certain extent) formed by the cross members and the cushioning material, and hence the air exhausted through exhaust duct 2240 flows in the directions shown by arrow E (10), arrow E (20), and arrow E (30), as well as in the direction of arrow B.

Furthermore, each of the exhaust airflow shown by arrow E (13), the exhaust airflow shown by arrow E (23), the exhaust airflow shown by arrow E (33) is exhausted from the lower part of the rear seat, the center tunnel, the scuff, or the like, adjacent thereto, into the vehicle interior or to the outside of the vehicle.

As described above, with the cooling device according to the present embodiment, three ventilating openings, two curved ventilating ducts, and one straight ventilating duct are provided in the cushioning materials provided on the cross member and under the floor carpet, so that the air exhausted through exhaust duct 2240 of electric-powered battery cooling fan 2110 can be diffused. In this case, there is no need to specially provide an independent duct specifically designed for exhaust air, and hence no additional space is required.

Each of the above-described embodiments has been described as an embodiment in which the ventilating opening is provided in the cross member and the ventilating duct is provided in the cushioning material. However, the present invention may have a cooling device having any one of the ventilating opening and the ventilating duct.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A cooling device cooling an electric apparatus mounted on a vehicle, comprising:
    an intake duct through which air is introduced into a housing accommodating said electric apparatus;
    an exhaust duct through which air is exhausted from said housing; and
    a draft-type fan provided on route of said exhaust duct,
    on a floor panel, there being provided a first cross member, a second cross member disposed on a rear side of the vehicle with respect to said first cross member, a first cushioning material provided between the floor panel and a floor carpet and disposed on said second cross member, and a second cushioning material provided between the floor panel and the floor carpet and disposed on the rear side of the vehicle with respect to said second cross member and said first cushioning material,
    between the floor panel and the floor carpet, there being formed a closed space partitioned by said first cross member, and said second cross member and said first cushioning material,
    said fan being disposed between said first cross member and said second cross member, and said exhaust duct exhausting air from said housing to said closed space, and
    a channel which is opened to said closed space, which is formed to be in communication between said first cushioning material and said second cushioning material, and which allows air exhausted from said housing to flow therethrough, being formed inside said first cushioning material and said second cushioning material.

2. The cooling device according to claim 1, wherein a plurality of said channels allowing air exhausted from said housing to flow therethrough are formed inside said first cushioning material and said second cushioning material.

3. The cooling device according to claim 1, wherein said channel which allows air exhausted from said housing to flow therethrough, which is branched inside said second cushioning material, and which has a plurality of outlets, is formed inside said first cushioning material and said second cushioning material.

4. The cooling device according to claim 1, wherein said channel has a curved shape.

* * * * *